United States Patent
Miyaoh

[19]

[11] Patent Number: 6,161,842
[45] Date of Patent: Dec. 19, 2000

[54] METAL GASKET WITH DIFFERENT SURFACE PRESSURE PORTIONS

[75] Inventor: Yoshio Miyaoh, Tokyo, Japan

[73] Assignee: Ishikawa Gasket Co., Ltd., Tokyo, Japan

[21] Appl. No.: 09/300,267

[22] Filed: Apr. 27, 1999

[30] Foreign Application Priority Data

May 8, 1998 [JP] Japan ................................. 10-125810

[51] Int. Cl.$^7$ ........................................................ F16J 15/08
[52] U.S. Cl. .......................... 277/653; 277/594; 277/595
[58] Field of Search .................................. 277/653, 541, 277/931, 595, 594

[56] References Cited

U.S. PATENT DOCUMENTS

| | | |
|---|---|---|
| 4,728,110 | 3/1988 | Nakasone . |
| 4,739,999 | 4/1988 | Ishii et al. . |
| 4,759,585 | 7/1988 | Udagawa . |
| 4,807,892 | 2/1989 | Udagawa . |
| 4,861,046 | 8/1989 | Udagawa . |
| 4,867,462 | 9/1989 | Udagawa . |
| 4,938,488 | 7/1990 | Udagawa et al. . |
| 4,995,624 | 2/1991 | Udagawa et al. . |
| 5,062,649 | 11/1991 | Udagawa . |
| 5,378,001 | 1/1995 | Miyaoh . |
| 5,549,307 | 8/1996 | Capretta et al. . |
| 5,853,175 | 12/1998 | Udagawa . |
| 5,893,566 | 4/1999 | Miyaoh et al. . |

OTHER PUBLICATIONS

Patent Abstracts of Japan, 63 210464 (Nippon Metal Gasket KK), Sep. 1, 1988.

*Primary Examiner*—Terry Lee Melius
*Assistant Examiner*—William L. Miller
*Attorney, Agent, or Firm*—Kanesaka & Takeuchi

[57] ABSTRACT

A metal gasket is formed of first, second and third metal plates laminated together. The first metal plate has a first hole, and the second metal plate is situated above the first metal plate and has a second hole. The second hole is greater than the first hole and has a second edge located above the first metal plate. A first bead is formed in at least one of the first and second metal plates to surround the first and second holes. The third metal plate includes a base portion situated above the second metal plate, a curved portion extending from the base portion and situated inside the first and second holes, and a flange extending from the curved portion and situated under the first metal plate. The flange has a third edge located between the first and second edges, so that high surface pressure areas are formed above the flange and the first bead with a low surface pressure area therebetween, by which the gasket can be securely sealed.

11 Claims, 2 Drawing Sheets

METAL GASKET WITH DIFFERENT SURFACE PRESSURE PORTIONS

Background of the Invention and Related Art Statement

The present invention relates to a metal gasket with different surface pressure portions or distinctive seal lines, which is useful for sealing a portion subjected to heat deformation and/or having low rigidity. The gasket is useful as a manifold gasket for connecting a cylinder head to a manifold, and a flange gasket for connecting a manifold to an exhaust pipe, or other device.

The manifold or exhaust pipe to which the manifold gasket or flange gasket is installed includes a flange at an end of a pipe. The rigidity of the flange is relatively low, and the flange is heated and cooled repeatedly because of high temperature exhaust gas passing through the manifold and exhaust pipe. Therefore, the flange expands and contracts, i.e. subjected to heat deformation, repeatedly whenever the engine is actuated.

The gasket for sealing the manifold or exhaust pipe must seal the flange which deforms according to heat. In particular, a surface configuration of the flange may be partly deformed, and a space to be sealed by the gasket may be changed, by the heat deformation of the flange. Since the gasket has to seal the deformed flange or flanges, the gasket must have sufficient compressibility or resiliency for absorbing the deformation of the flange.

Further, although the heat deformation at the flange occurs repeatedly when an engine is actuated, the resiliency of the gasket at the sealing portion must not be lost to securely seal at the flange. When a bead is used in the gasket for sealing the flange, it is required to prevent creep relaxation and crack formation at the bead.

In view of the requirements as stated above, a gasket 2 as shown in FIG. 4 has been proposed in Japanese Patent Publication (KOKAI) No. 4-219572. The gasket 2 is formed of a plate 22 with a bead 22b, and an upper plate 23 with a curved portion 23a and a flange 23b. The width Wb of the bead 22b is changed such that as the bead 22b approaches a bolt hole for the gasket 2, the width of the bead 22b is reduced and the height of the bead 22b is increased. In this gasket 2, when the gasket is tightened, the surface pressure formed on the bead becomes generally equal to thereby compensate the deformation of the flange.

In the gasket 2, a stopper portion 25 formed of three plate portions is established at the flange 23b, and the bead 22b extends from a portion above the flange 23b to a portion outside the flange 23b. Thus, when the gasket 2 is tightened, the bead 22b is not completely compressed by the stopper portion 25, which prevents creep relaxation of the bead 22b. However, since an area extending from the curved portion 23a to the bead 22b on the flange 23b is formed of the plate portions with the same thickness, a sealing portion for a hole 3 is formed of one portion extending from the curved portion 23a to the bead 22b.

Namely, in order to provide a sufficient sealing ability while absorbing a large heat deformation at the flange around the hole 3, a plurality of sealing areas must be formed around the hole 3. However, since the gasket 2 has one stopper portion 25 formed of the three plate portions, the thickness at the stopper portion 25 is the same. Thus, the surface pressure of the stopper portion 25 when the gasket 2 is tightened is gradually reduced, as shown in FIG. 5(b). Namely, an effective second sealing portion is not formed around the hole 3.

Also, since the gasket 2 has one bead 22b, a space to be sealed at the flange of the pipe is limited to the size of the bead 22b. Thus, if the space to be sealed is large, the bead 22b must be wide and high, which may result in creep relaxation of the bead. Further, since the height and width of the bead 22b are gradually changed, the manufacturing cost of the gasket is increased.

The present invention has been made in view of the above, and an object of the invention is to provide a metal gasket suitable for a gasket attaching portion with heat deformability and low rigidity.

Another object of the invention is to provide a metal gasket as stated above, which can provide a plurality of distinctive seal lines to securely seal around the hole.

A further object of the invention is to provide a metal gasket as stated above, which can provide large bead compressibility to securely seal around a hole.

A further object of the invention is to provide a metal gasket as stated above, wherein creep relaxation of the bead is reduced or avoided.

Further objects and advantages of the invention will be apparent from the following description of the invention.

SUMMARY OF THE INVENTION

A metal gasket of the invention is formed of first, second and third metal plates laminated together. The first metal plate has a first hole with a first edge, and the second metal plate is situated above the first metal plate and has a second hole with a second edge, which is greater than the first hole. The second edge is located above the first metal plate. A first bead is formed in at least one of the first and second metal plates to surround the first and second holes, and is situated laterally outside the first and second edges.

The third metal plate includes a base portion situated above the second metal plate, a curved portion extending from the base portion and situated inside the first and second holes, and a flange extending from the curved portion and situated under the first metal plate. The flange has a third edge located between the first and second edges. When the gasket is tightened, high surface pressure areas are formed at the flange and the first bead, and a low surface pressure area is formed therebetween.

Preferably, the total thickness of the first and third metal plates at the flange is greater than the total thickness of the first, second and third metal plates located outside the flange relative to the hole to be sealed.

In the gasket of the invention, since the low surface pressure area is formed between the two high surface pressure areas, two sealing lines are formed at the high surface pressure areas around the hole to be sealed. One sealing line is located above the flange, while the other sealing line is located above the first bead. The two sealing lines can securely seal around the hole.

In the invention, when the gasket is fully tightened, the first bead is not completely compressed by a stopper portion at the flange. Therefore, creep relaxation of the first bead is reduced or avoided.

In the invention, the hole is sealed by the stopper portion without substantial resiliency, and the first bead with resiliency, which form the two sealing lines. Therefore, the gasket can securely seal around the hole even if the gasket is vibrated severely, and can be used for a long time. Since the gasket is compressed at the gasket attaching portions with two sealing lines, the area for receiving the surface pressure becomes wide. Therefore, even if the gasket attaching portion is formed of soft metal, such as aluminum or alloy thereof, the gasket attaching portion is not damaged or deformed.

Preferably, the first metal plate has a thickness less than that of the third metal plate. When the first, second and third metal plates are assembled without applying a tightening force to the gasket, a ratio between the thicknesses or heights at the flange and that at the bead is 1.2 to 2.0. As a result, the surface pressures at the stopper portion and the first bead are effectively utilized when the gasket is compressed in actual usage.

Preferably, the first metal plate includes the first bead, and the second metal plate includes a second bead situated over the first bead. The first and second beads have the same sizes and project in the directions opposite to each other.

DETAILED DESCRIPTION OF PREFERRED EMBODIMENTS

Now, the invention will be explained with reference to the drawings.

Figure 1:
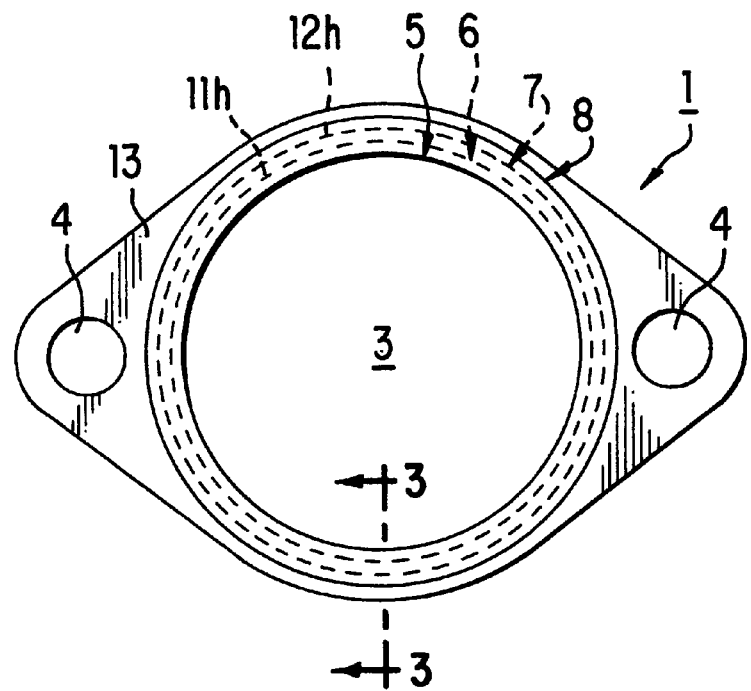
FIG. 1 is a plan view of a metal gasket of the invention.
Figure 2:
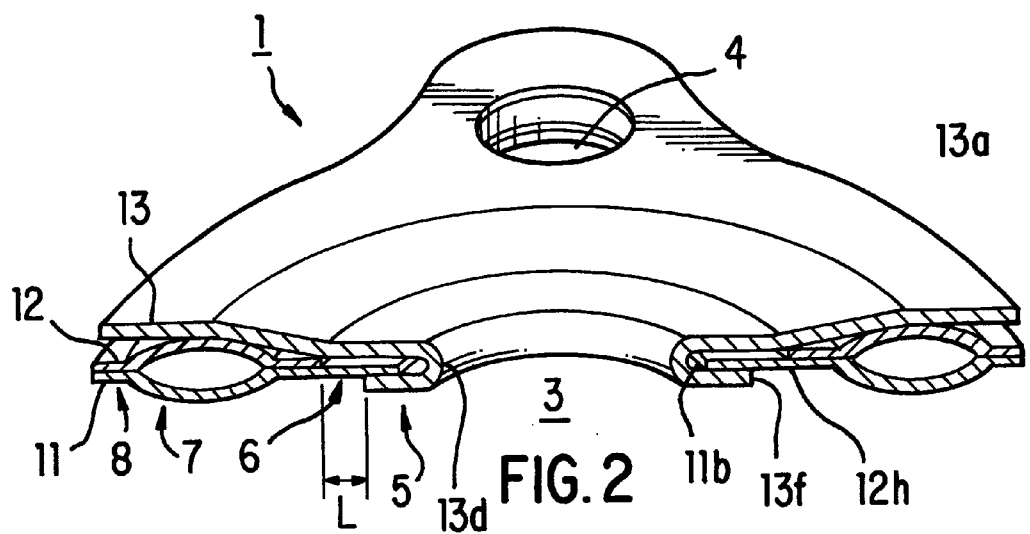
FIG. 2 is an enlarged perspective sectional view of the metal gasket of the invention.
Figure 3:
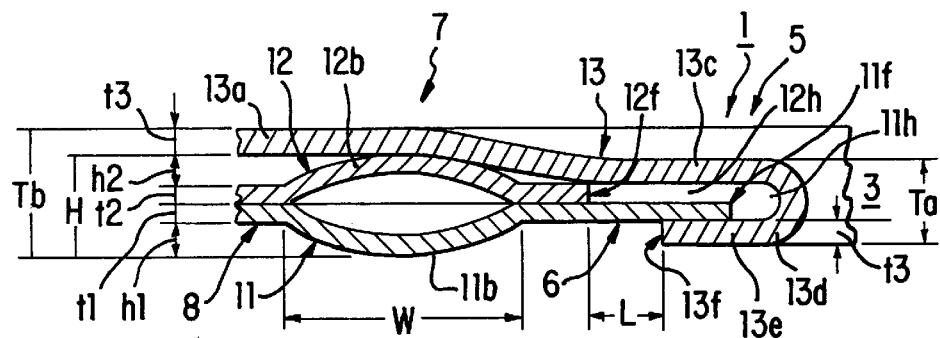
FIG. 3 is an enlarged sectional view taken along line 3—3 in FIG. 1.
Figure 4:
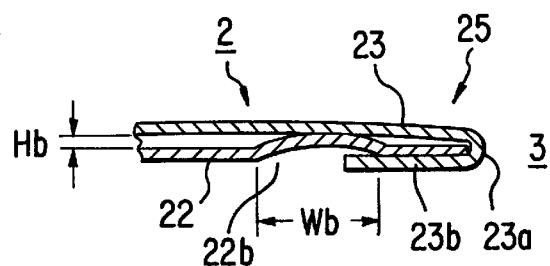
FIG. 4 is a sectional view, similar to FIG. 3, of a conventional gasket.

FIGS. 1–3 show a flange gasket 1 to be situated between a cylinder head and a manifold, or between a manifold and an exhaust pipe. The gasket 1 has a hole 3 to be sealed and two bolt holes 4, as holes, and includes a stopper section 5, an intermediate section 6, a bead section 7 and an outer section 8 arranged concentrically outwardly in order from the hole 3.

The gasket 1 is formed of a metal plate 11, a metal plate 12 disposed on the metal plate 11, and an upper plate 13 thicker than the plate 12 and disposed above the plate 12. The plate 11 includes a hole 11$h$ and a bead 11$b$ around the hole 11$h$, while the plate 12 includes a hole 12$h$ having a diameter greater than that of the hole 11$h$, and a bead 12$b$ around the hole 12$h$. The beads 11$b$, 12$b$ have the same widths and heights, and project outwardly in opposite directions.

The upper plate 13 has a main portion 13$a$, a curved portion 13$d$ situated inside the holes 11$h$, 12$h$ to define the hole 3, and a flange 13$e$ situated under the plate 11. An edge 13$f$ of the flange 13$e$ is located inwardly away from an inner edge 12$f$ of the plate 12 for a distance L, by which the intermediate section 6 is formed.

Namely, the edge 13$f$ is located between an inner edge 11$f$ of the plate 11 and the inner edge 12$f$ of the plate 12.

In the gasket 1, in case the thicknesses of the plates 11, 12, 13 are defined as t1, t2, t3, and the heights of the beads 11$b$, 12$b$ are defines as h1, h2, the gasket 1 has the specific thicknesses and heights.

In particular, in the compressed condition of the gasket situated between a manifold and an exhaust pipe and tightened by bolts (not shown), since the stopper section 5 is formed of the flange 13$e$, a part of the main portion 13$a$ and a part of the plate 11, the thickness at the stopper section 5 is expressed as ta=2 ×t3+t1. The intermediate section 6 between the stopper section and the bead section 7 is formed of a part of the main portion 13$a$ and a part of the plate 11, i.e. t1+t3. The bead section 7 extending from the edge of the plate 12 to surround the hole 12$h$ has the thickness expressed as tb=t1+t2+t3.

In the assembled condition of the gasket 1, i.e. non-compressed condition, the stopper section 5 has the height of Ta=t1+2×t3+t2, while the bead section 7 has the height of Tb=t1+t2+t3+h1+h2.

In the gasket 1 of the invention, the thickness t3 of the upper plate 13 is thicker the thickness t2 of the plate 12. Therefore, when the gasket is compressed, the thickness ta at the stopper section 5 becomes greater than the thickness tb at the bead section 7, so that the beads 11$b$, 12$b$ at the bead section 7 are not completely compressed or flattened by the stopper section 5. Thus, the stopper section 5 protects the beads 11$b$, 12$b$ to prevent creep relaxation of the beads when the gasket is tightened.

Further, in the assembled condition of the gasket 1, it is preferable that the ratio Ta/Tb of the height Ta at the stopper section 5 to the height Tb at the bead section 7 is in a range between 1.2 and 2.0. In this range, it is possible to obtain a sufficient compressibility at the bead section 7, and to properly protect the beads 11$b$, 12$b$ by the stopper section 5. The hole 3 can be securely sealed, as well. Therefore, the bead protection with good sealing ability can be made cooperatively.

When the gasket 1 of the invention is situated between a manifold and an exhaust pipe (both not shown) and is tightened by bolts, firstly, the beads 11$b$, 12$b$ at the bead section 7 are compressed and deformed. A surface pressure is formed by the resiliency of the compressed beads 11$b$, 12$b$ to thereby form one sealing line. Then, the bead section 7 is resiliently compressed to the height Ta. Thus, the stopper section 5 and the bead section 7 provide resilient surface pressures.

When the gasket 1 is further tightened, the curved portion 13$d$ at the stopper section 5 is fully bent. Even if the gasket is further tightened, the gasket 1 is not compressed any more, and has the thickness ta at the stopper section 5. In this condition, a portion 13$c$ and the flange 13$e$ of the upper plate 13 at the stopper section 5 abut against the plate 11, by which the bead section 7 is protected.

In this condition, since the portion for the length L or the intermediate section 6 is formed of two plates, i.e. upper plate 13 and plate 11, the sealing pressure at the intermediate portion 6 becomes less than the sealing pressures at the stopper section 5 and the bead section 7. Thus, the stopper section 5 forms a first seal line thereon to seal around the hole 3.

Also, since the bead section 7 outside the intermediate section 6 is formed of the three plates, when the gasket 1 is tightened, the edge of the hole 12$h$ is compressed to form a second seal line, which extends from the edge of the hole 12$h$ to the outer ends of the beads 11$b$, 12$b$. In this condition, since the total thickness tb at the bead section 7 is less than the total thickness ta at the stopper section 5, the beads 11$b$, 12$b$ are not completely flattened. Thus, the beads 11$b$, 12$b$ are held in a resilient condition and form the second seal line.

Figure 5A:
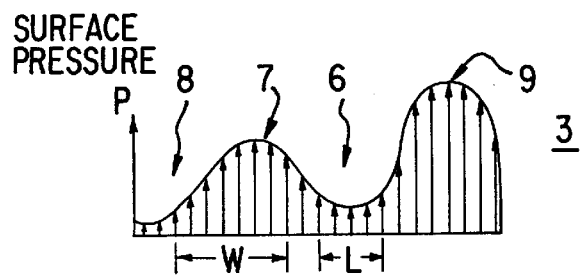
FIG. 5(a) is a graph showing a surface pressure formed on the metal gasket of the invention.
Figure 5B:
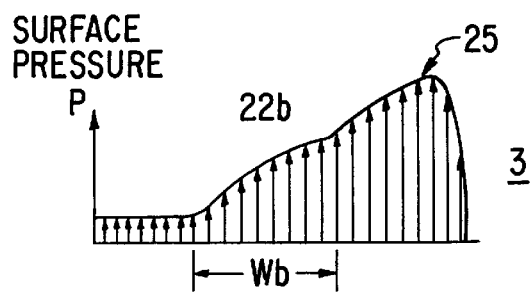
FIG. 5(b) is a graph showing a surface pressure formed on the conventional metal gasket shown in FIG. 4.

In the invention, when the gasket 1 is compressed, the surface pressures of the gasket 1 can be formed as shown in FIG. 5(a). Namely, the stopper section 5 has the largest surface pressure; the intermediate section 6 has a middle surface pressure; the bead section 7 extending from the intermediate section has the large surface pressure, i.e. less than that at the stopper section 5; and the outer section 8 has the lowest surface pressure. Therefore, the stopper section 5 and the bead section 7 provide two seal lines to securely seal around the hole 3. Also, the durability of the gasket is improved.

Since the thickness ta of the metal plates at the stopper section 5 is made greater than the thickness tb at the bead section 7, the stopper section 5 operates to prevent the flattening or creep relaxation of the beads 11b, 12b. The beads 11b, 12b are protected by the stopper section 5 to improve the durability and sealing ability.

In case the beads 11b, 12b are formed to orient outwardly with the same width W, even if the width of the gasket is narrow, the total height of the beads can be made relatively high with respect to the width thereof. Also, since the beads can be deformed while keeping the resiliency thereof, the bead section 7 has good compressibility and resiliency to improve the sealing ability. Further, in case the two beads are formed, creep relaxation of the beads is improved with respect to one bead, so that the durability of the gasket is further improved.

Still further, since the plate 12 is sandwiched between the upper plate 13 and the plate 11, and flange 13e is located under the plate 11, gas passing through the hole 3 does not enter between the plates. Thus, the sealing ability and durability are further improved.

Still further, since the plate 12 is disposed away from the edge 13f of the flange 13e for the distance L, the ratio Tb/Ta relative to the assembled thicknesses or heights of the stopper section 5 and the bead section 7 can be easily adjusted. The ratio Tb/Ta=1.2–2.0 can be set easily.

In this ratio, even if gasket attaching portions of the manifold or pipe are deformed by heat in use or tightening of the bolts in installment, the gasket can follow the deformation thereof. Namely, the gasket can seal around the hole 3 by the stopper section 5 and the bead section 7 even if the gasket attaching portions are deformed.

In the invention, since the gasket can provide plural sealing lines around the hole, the gasket attaching portions for supporting the sealing lines can be enlarged. Even if the gasket attaching portion is formed of aluminum or its alloy, the gasket attaching portion is not damaged by the strong surface pressure of the gasket.

In the gasket 1 of the invention, the metal plates 11, 12 have the beads 11b, 12b, respectively. However, one bead formed on the metal plate 11 or 12 may be sufficient if the bead provides sufficient resiliency and compressibility. For example, the bead 12b on the plate 12 may be omitted.

While the invention has been explained with reference to the specific embodiments of the invention, the explanation is illustrative, and the invention is limited only by the appended claims.

What is claimed is:

1. A metal gasket comprising:
   a first metal plate having a first hole with a first edge,
   a second metal plate situated above the first metal plate and having a second hole, said second hole being greater than the first hole and having a second edge located above the first metal plate,
   a first bead formed in the first metal plate to surround the first and second holes, and situated laterally outside the first and second edges,
   a second bead formed in the second metal plate and situated over the first bead, and
   a third metal plate including a base portion situated above the second metal plate, a curved portion extending from the base portion and situated inside the first and second holes, and a flange extending from the curved portion and situated under the first metal plate, said flange having a third edge located between the first and second edges so that high surface pressure areas are formed above the flange and the first bead with a low surface pressure area therebetween, said third metal plate having a thickness greater than that of the second metal plate so that a total thickness of the gasket at the flange formed of the first and third metal plates is greater than that at the first bead formed of the first, second and third metal plates.

2. A metal gasket according to claim 1, wherein said first metal plate has a thickness less than that of the third metal plate so that when the first, second and third metal plates are assembled without applying compression force to the gasket, a ratio between a thickness of the gasket at the flange and that at the bead is 1.2 to 2.0.

3. A metal gasket according to claim 1, wherein said first and second beads have same lateral and vertical sizes and project in directions opposite to each other.

4. A metal gasket according to claim 1, wherein a surface pressure at the flange is greater than that at the first bead when the gasket is compressed.

5. A metal gasket comprising:
   a first metal plate having a first hole with a first edge,
   a second metal plate situated above the first metal plate and having a second hole, said second hole being greater than the first hole and having a second edge located above the first metal plate,
   a first bead formed in at least one of the first and second metal plates to surround the first and second holes, and situated laterally outside the first and second edges, and
   a third metal plate including a base portion situated above the second metal plate, a curved portion extending from the base portion and situated inside the first and second holes, and a flange extending from the curved portion and situated under the first metal plate, said flange having a third edge located between the first and second edges so that high surface pressure areas are formed above the flange and the first bead with a low surface pressure area therebetween,
   wherein said gasket includes a stopper section at the flange without resiliency, an intermediate section between the third edge and the second edge, and a bead section between the second edge and an outer edge of the bead away from the second edge, said bead section having a surface pressure less than that of the stopper section and greater than that at the intermediate section when the gasket is completely tightened.

6. A metal gasket according to claim 5, wherein a total thickness of the gasket at the flange formed of the first and third metal plates is greater than that at the first bead formed of the first, second and third metal plates.

7. A metal gasket according to claim 6, wherein said bead section is not completely compressed by the stopper section when the gasket is tightened, to thereby prevent creep relaxation of the first bead.

8. A metal gasket according to claim 7, wherein said first metal plate has a thickness less than that of the third metal plate so that when the first, second and third metal plates are assembled without applying compression force to the gasket, a ratio between a thickness of the gasket at the flange and that at the bead is 1.2 to 2.0.

9. A metal gasket according to claim 8, wherein said first metal plate includes said first bead, and said second metal plate includes a second bead situated over the first bead.

10. A metal gasket according to claim 9, wherein said first and second beads have same lateral and vertical sizes and project in directions opposite to each other.

11. A metal gasket according to claim 5, wherein said gasket further includes an outer section outside the bead section, said outer section having a surface pressure less than that of the intermediate section when the gasket is completely tightened.

* * * * *